United States Patent [19]
Nakatani et al.

[11] 4,207,473
[45] Jun. 10, 1980

[54] FRAME DETECTION CIRCUITRY FOR MICROFILM READER APPARATUS

[75] Inventors: Keiji Nakatani, Machida; Hidenori Suzuki, Kawasaki, both of Japan

[73] Assignee: Minolta Camera Kabushiki Kaisha, Osaka, Japan

[21] Appl. No.: 913,014

[22] Filed: Jun. 6, 1978

[30] Foreign Application Priority Data

Jun. 17, 1977 [JP] Japan .............................. 52-80314[U]
Dec. 16, 1977 [JP] Japan ............................ 52-170133[U]

[51] Int. Cl.² .............................................. G06K 7/10
[52] U.S. Cl. .................... 250/570; 353/26 A
[58] Field of Search .......................... 353/26 R, 26 A; 250/560, 561, 570, 548, 214 R, 214 C

[56] References Cited

U.S. PATENT DOCUMENTS

| | | | |
|---|---|---|---|
| 3,214,594 | 10/1965 | Thomson | 250/548 |
| 3,885,866 | 5/1975 | Stearns | 250/570 |
| 3,931,513 | 1/1976 | Germain | 250/561 |
| 4,043,652 | 8/1977 | Mickelson | 353/26 A |
| 4,146,797 | 3/1979 | Nakagawa | 250/548 |

Primary Examiner—David C. Nelms
Attorney, Agent, or Firm—Watson, Cole, Grindle & Watson

[57] ABSTRACT

Frame detection circuitry for sensing frame sensing marks on a microfilm uses first and second photoelectric convertors respectively responsive to the light transmitted from the frame sensing mark and from light transmitted by a light emitter to generate respective first and second output signals, whereby the light emission received by the second photoelectric convertor is unaffected by movement of the microfilm such that the second output signal is a reference level signal. The first and second output signals are compared to generate a control signal representing the sensing of a frame when the first output signal exceeds the second output signal. A circuit may be used to filter the noise detected by the second photoelectric convertor.

6 Claims, 13 Drawing Figures

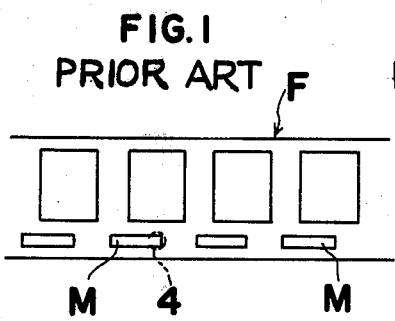
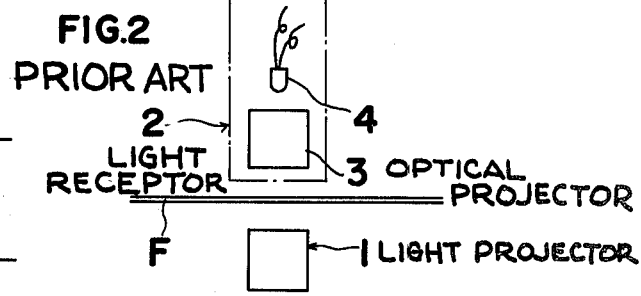
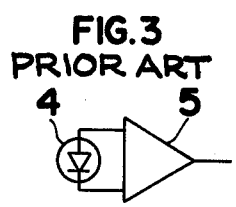
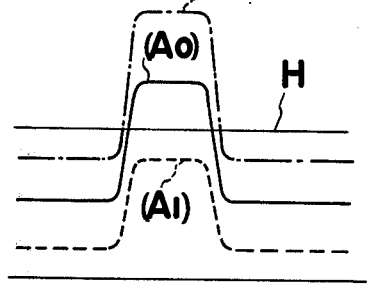
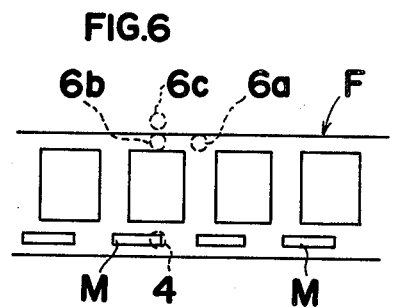
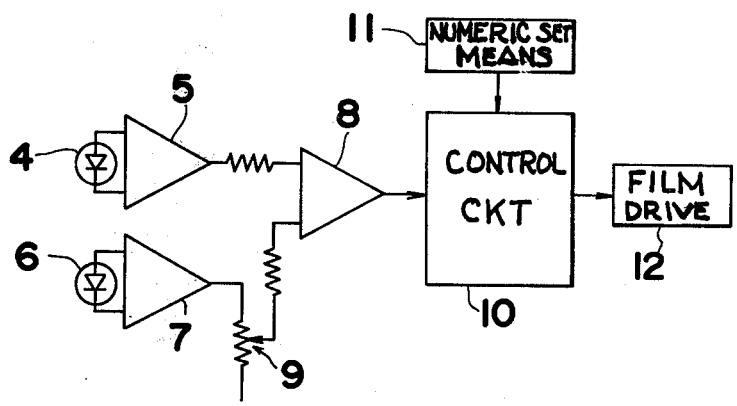

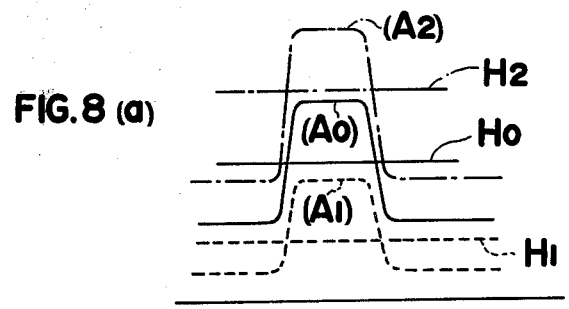
FIG.8 (a)
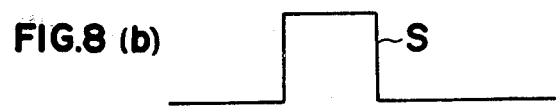
FIG.8 (b)
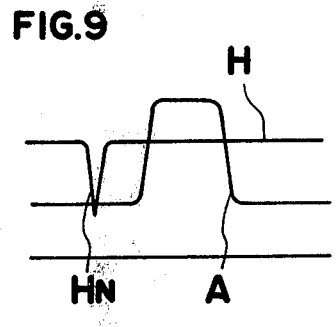
FIG.9
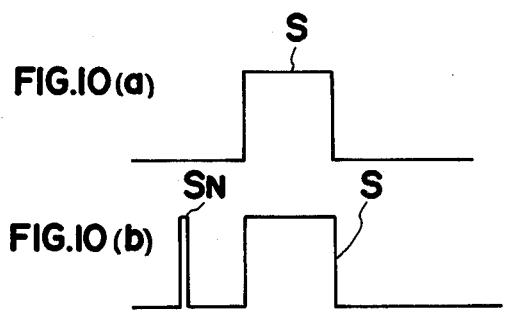
FIG.10(a)
FIG.10(b)
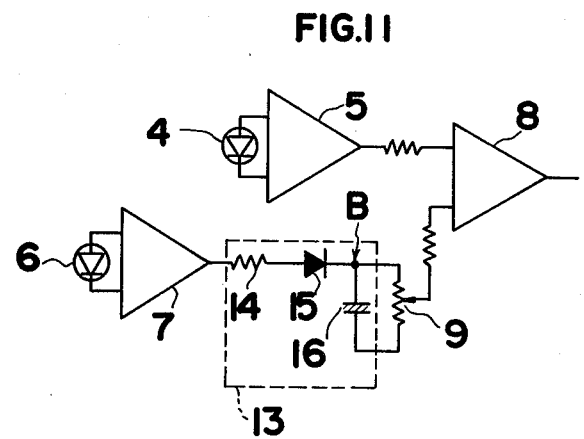
FIG.11

FRAME DETECTION CIRCUITRY FOR MICROFILM READER APPARATUS

BACKGROUND OF THE INVENTION

1. Field of the Invention

This invention relates to frame detection circuitry for microfilm reader apparatus, and more particularly to such circuitry, in which the driving control of the microfilm is accomplished according to the detection of specific marks or frames on the microfilm.

2. Prior Art

According to the prior art attempts to detect the frames of a roll type microfilm, the distance between frame-sensing marks, for example such as blip-forming marks, bar codes or the like on microfilm F, which appear at positions corresponding to respective frames or a distance between the adjoining frames, as shown in FIG. 1, is detected by means of sensing marks M. More particularly, as shown in FIG. 2, light projector 1 including a light source, a condenser lens and the like is positioned in opposed relation to light receptor 2 including optical projector 3 and photoelectric converting element 4. Flashing light, transmitted through microfilm F due to the presence of frame-sensing marks or the frames themselves, is received by photoelectric converting element 4, and the output thereof is amplified by amplifier 5, as shown in FIG. 3, after which the outputs of amplifier 5 are counted (in the case of blip marks), or the width of an output signal is discriminated (in the case of a bar code), thereby detecting a desired frame. However, for achieving an accurate function of the aforenoted detecting means, it is mandatory that the quantity of light illuminated from projecting unit 1 onto a reading-out portion of microfilm F, which portion carries the aforenoted frame-sensing marks M or the like, be consistent or stable. In other words, where the quantity of light illuminated from light projector 1 is proper, an output of photoelectric converting element 4, which receives the light transmitted through a reading-out portion of microfilm F, exhibits pulse waveform Ao which is defined by a high amplitude corresponding to the light transmitted through mark portion M, and a low amplitude corresponding to the light transmitted through a portion other than the mark portion M, as shown by a solid line in FIG. 4. However, waveform Ao may be clipped at a given reference level H set relative to a "0" level, upon the shaping of the waveform. In this respect, where the quantity of light illuminated from light projector 1 is increased or decreased due to a voltage variation of an electric power source, or a variation in the quantity of light of a light source, for example due to deterioration during its service life, or due to stains and the like on a mirror included in projection element 3, the entire waveform is shifted up or down, as shown by a one-point chain line A₂ and broken line A₁ in FIG. 4, respectively, while reference level H remains constant, with the result that waveform A₁ fails to detect mark M. In contrast thereto, in the case of a reader or a reader printer, in which the lens magnification may be varied, there is provided means, such as a variable resistor and the like, for adjusting reference level H to be used in the shaping of the aforementioned waveforms or the mark-detecting-sensitivity, commensurate with the quantity of light illuminated. However, such an adjusting operation requires an expenditure of much time and effort for changing the quantity of light being illuminated, with an accompanying detection error, if the operator commits a mistake in the adjustment, or in the worst case, the film itself is damaged. For those reasons, such an adjusting operation is not suitable for preventing a detection error accruing from a variation in the quantity of illuminating light.

SUMMARY OF THE INVENTION

It is a principal feature of the present invention to provide a microfilm reader equipped with control means which obviates detection errors due to variations in the detected quantity of light from a light-emitting unit, and wherein the detected light is used for controlling the driving of a film.

Another feature of the present invention is to provide a microfilm reader which includes at least one second photoelectric converting element, adapted to receive the light from an illuminating unit which also generates an optical input to a first photoelectric converting element, for detecting a frame, mark or the like on a microfilm, whereby the output of the first photoelectric converting element is compared with the output of the second photoelectric converting element for deriving frame-sensing signals.

Another feature of the present invention is to provide a microfilm reader which includes a smoothing circuit for use in smoothing the output of the second photoelectric converting element, thereby preventing a malfunction, such as erroneous counting, of the frame-sensing means.

The above and other features and advantages of the invention will become more fully apparent from a reading of the following description of the annexed drawings which illustrate preferred embodiments of the invention.

BRIEF DESCRIPTION OF THE DRAWINGS

FIG. 1 is a top view of a prior art microfilm, including sensing marks, and a photoelectric converting element for use in detecting the marks;

FIG. 2 is a side view of the film shown in FIG. 1, showing a prior art light projector and light receptor for use in sensing a mark;

FIG. 3 shows a circuit including an amplifier adapted to receive an output of a photoelectric converting element in the light receptor of FIG. 2;

FIG. 4 is a graphic representation of the relationship between an output of a photoelectric converting element and a reference level signal;

FIG. 6 shows various arrangements of photoelectric converting elements for use in the frame-sensing circuitry according to the present invention.

FIG. 7 is a diagram showing an embodiment of a frame-sensing circuit according to the present invention and including a film drive control circuit responsive to the frame-sensing circuit output;

FIG 8a is a graphic illustration of the amplified frame-sensing outputs according to the invention showing the manner in which the clipping level is automatically adjusted in accordance with the detected light;

FIG. 8b illustrates a comparator output in the film-sensing circuitry;

FIG. 9 illustrates the relationship of detected noise with respect to a valid signal in the circuit of FIG. 7;

FIG. 10a represents a normal output waveform according to the invention;

FIG. 10b shows output waveforms corresponding to the signals shown in FIG. 9; and FIG. 11 is a modified embodiment of a portion of the frame-sensing circuit including a smoothing circuit for preventing the detection of noise.

DETAILED DESCRIPTION

Figure 5:
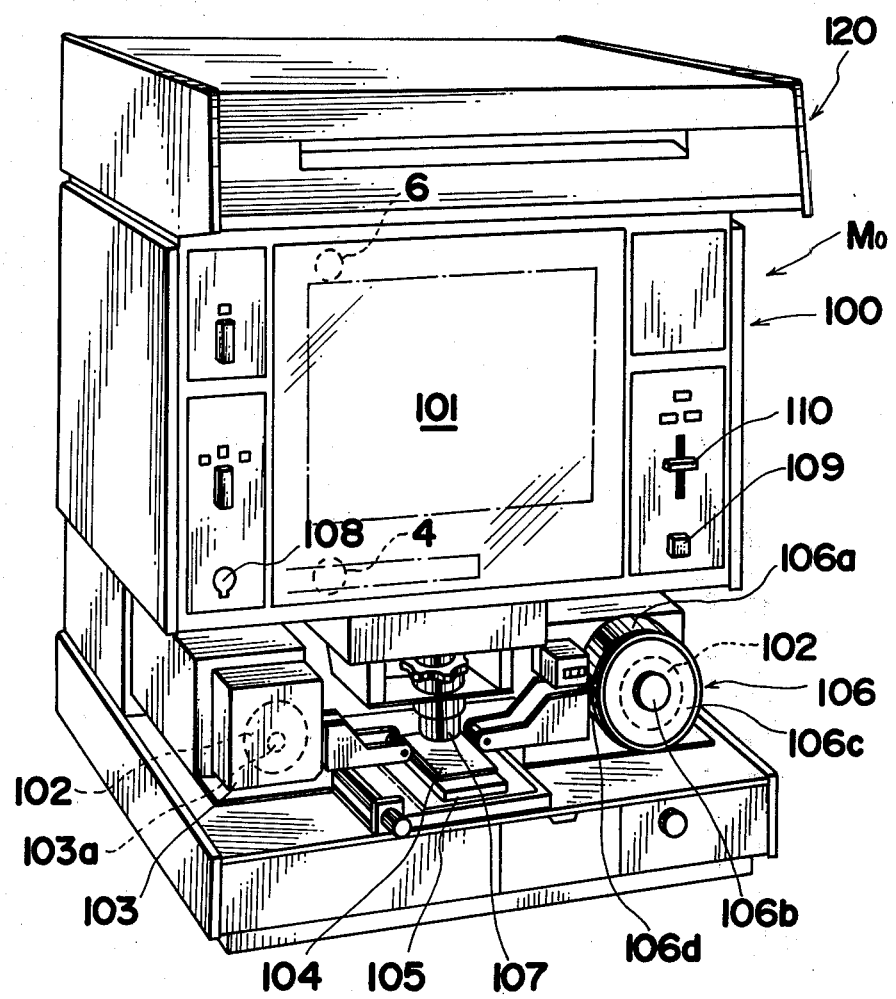
FIG. 5 is a perspective view showing a microfilm reader in which the frames-sensing circuitry according to the present invention may be used.

With reference to FIG. 5, reader printer apparatus Mo generally includes microreader subsection 100 and printer subsection 120 with power switch 108, print switch 109, exposure adjusting knob 110, and other control elements not shown. In the microreader portion 100 wherein images or data contained in film roll 102 are projected onto an observation screen 101, wound film roll 102 is accommodated in cartridge 103 which is mounted at the left-hand portion of reader printer apparatus Mo in a position below screen 101. The leading edge of film roll 102 is withdrawn from cartridge 103 and wound on take-up reel 106 disposed at the right-hand side of reader printer apparatus Mo after passing through light transmitting plates 104 and 105, for example, of glass material. The film is driven in a known manner, the detailed description of which is unnecessary for the purposes of the present invention. The feeding of film roll 102 is suspended when a desired frame thereof, detected by a suitable means, is positioned between plates 104 and 105, while the particular frame is subjected to light projection from its under side by a light source (not shown). The light images of the frame are projected onto screen 101 by lens projecting assembly 107 through an optical system (not shown) including reflecting mirrors, etc. In the arrangement shown in FIG. 5, film roll 102 is, at one end thereof, fixed to, or caught by, rotary shaft 103a within the cartridge 103 and is prevented from disengagement. Take-up reel 106 includes fixed cylindrical outer case 106a and a pair of reel blades 106c fixed in spaced relation to rotary shaft 106b to cover opposite sides of outer case 106a, so that the leading edge of film roll 102, fed out from cartridge 103, enters outer case 106a through inlet opening 106d formed in an outer periphery of case 106a. The film end is held between the pair of reel blades 106c to be taken up onto rotary shaft 106b. In FIG. 5, the feeding-out of film roll 102 from cartridge 103 is controlled at the side of take-up reel 106, while the rewinding is controlled at the side of cartridge 103 through suitable clutch means (not shown).

An embodiment of the present invention is described in more detail with reference to FIG. 6. Roll type microfilm F has frame-sensing marks M thereon in the positions corresponding to respective film frames. In the same manner as the prior art arrangement shown in FIG. 2, light projector 1 is positioned in opposed relation to light receptor 2 at an exposure station in the moving path of microfilm F. Light projector 1 includes a light source, a condenser lens and the like; light receptor 2, optical projector 3, which includes a lens, mirrors and the like, and is adapted to project the light transmitted from light projector 1; and photoelectric converting element 4 positioned as shown in light receptor 2, as in the case of the prior art arrangement. Thus, according to the present invention, a first photoelectric converting element 4 (shown by the broken line in FIGS. 5 and 6) is arranged in a position similar to that of the previously described prior art arrangement, for receiving the light transmitted through the mark M-corresponding portion of a moving microfilm. However, in accordance with the present invention, second photoelectric converting elements 6a, 6b are provided, for receiving the light transmitted through an upper edge portion of microfilm F, and receive a consistent quantity of light during the movement of the microfilm. Alternatively, second photoelectric converting element 6c, adapted to receive the light which has not been transmitted through the microfilm F, may also be used. First photoelectric converting element 4 and at least one second photoelectric converting element 6 are connected to comparator 8 via first amplifying circuit 5 and second amplifying circuit 7, as shown in FIG. 7, respectively. Comparator 8 may comprise a combination of a differential amplifying circuit with a waveform shaping circuit and the structure of the comparator 8 is well known as in an IC device. Comparator 8 generates an output signal S when the input from the first photoelectric converting element 4 exceeds the input from the second photoelectric converting element 6 as shown in FIG. 8. Output-adjusting means 9 (a variable resistor in FIG. 7) is provided between second amplifying circuit 7 and comparator 8 to vary the output of second amplifying circuit 7. It is understood that single second photoelectric converting element 6 may also comprise two or more elements to minimize or remedy any effects due to a change or deterioration in the sensitivity characteristics of such elements, because of the presence of dust and the like. In this case, plurality of photoelectric converting elements 6 are parallelly connected to each other.

The output of comparator 8 is fed to control circuit 10 including a counter and a digital comparator. Control circuit 10 also receives the output of numeric setting means 11 which designates the number of the film frame that is desired to be positioned in the microreader exposure station. The output of control circuit 10 is fed to film-driving means 12. The structure and operation of control circuit 10, numeric setting means 11, and film driving means 12 are known to those skilled in the art and a detailed description of their structure and operation is not necessary for the purposes of the present invention.

The operation of the frame-sensing circuitry having the previously described structure is such that as microfilm F is being moved, first photoelectric converting element 4 receives the light transmitted through frame-sensing mark M-portion of microfilm F. Second photoelectric converting element 6 receives light of a quantity less than that of the light absorbed by the microfilm where either photoelectric converting element 6a or 6b, or both photoelectric converting elements 6a and 6b, are arranged in the positions corresponding to an upper edge portion of microfilm F. Second photoelectric converting element 6c, arranged in a position adapted to directly receive the light illuminated from light projector 1, rather than the light transmitted through the microfilm F, directly receives light of a constant quantity which has not been reduced as with the use of photoelectric converting elements 6a and 6b. The respective outputs of first and second photoelectric converting elements 4, 6 are amplified by first and second amplifying circuits 5, 7, respectively. The outputs of respective amplifying circuits 5, 7 are fed into comparator 8, so that an output waveform Ao of first amplifying circuit 5 is clipped in terms of reference level Ho which is an output voltage of second amplifying circuit 7, as shown in FIG. 8a. Thereby, rectangular pulse signal S, shaped as shown in FIG. 8b, is generated by comparator 8.

According to the aforementioned operation, in the event that the quantity of light radiated from light projector 1 is reduced for one reason or another, not only the quantity of light received by first photoelectric converting element 4 is relatively or proportionally reduced, but also the quantity of light received by second photoelectric converting element 6, is also reduced as well, with the result that waveform $A_1$ for detecting a mark, as well as reference level $H_1$ are shifted downwardly, as shown by the broken lines in FIG. 8a, relative to the sensed-mark waveform Ao and reference level Ho, which represents the case of an optimum quantity of light being received. Thus, sensed-mark waveform $A_1$ is positively clipped according to reference level signal $H_1$. However, in case the quantity of light illuminated from light projector 1 is increased, then sensed-mark waveform $A_2$ and reference level $H_2$ are conversely shifted upwardly, with the result that waveform $A_2$ is positively clipped according to reference level signal $H_2$, thereby preventing a detection error such as is experienced with a prior art reader.

Accordingly, the detection waveform to be fed into control circuit 10 is by no means affected by a variation in the quantity of light radiated from light projector 1, thereby enabling positive control of a detection waveform. For instance, in case marks M are configured to cause the generation of electrical spikes or pulses, the number of the marks is counted and then compared with a numerical value set by the numeric setting means 11, so that when the comparison performed in control circuit 10 results in coincidence between the two inputs thereto, the operation of film-driving means 12 is interrupted.

However, where mark M is provided in the form of a bar code corresponding to each film frame, a detection waveform is generated in the form of a digital signal having a given bit format, which corresponds to the code. However, the comparison of the detection signal with the content of numeric setting means 11 is still accomplished by control circuit 10.

Furthermore, in case reference level signal H is derived externally, rather than by resorting to a constant voltage signal in a pure electrical sense, there necessarily arises a noise problem which in turn leads to the danger of an improper reference level signal being developed.

For instance, in case the second photoelectric converting elements for generating a reference signal are arranged in the positions 6a, 6b, in which they are adapted to detect the quantity of light transmitted from such a film portion wherein the quantity of transmitted light is deemed not to be varied or affected by the movement of film F, there possibly arises a problem that dust, stain or the like cling to the film, so that noise occurs on the output signals from second photoelectric converting elements 6a, 6b. Thus, in case such an output signal is intended to be derived from comparator 8 via amplifiers 5, 7, as shown in FIG. 7, as a detection signal for frame-sensing mark M, the waveforms delivered via amplifying circuits 5, 7 from respective photoelectric converting elements 4, 6 are as shown in FIG. 9. Stated differently, in a normal condition, where the amplitude of output signal A from amplifier 7 remains higher than that of the amplitude of reference level signal H, the clipped signal is derived from comparator 8 as detection signal S, as shown in FIG. 10a. However, when noise represented by signal $H_N$ in FIG. 9 appears on reference level signal H, and is then mixed or intersects with a low level portion of output signal A from amplifier 7, detection signal $S_N$ is derived from comparator 8, as shown in FIG. 10b, thus causing erroneous counting or detection.

To combat that shortcoming, according to the present invention, smoothing circuit 13 (represented by a broken line in FIG. 11) is interposed between amplifier 7 and comparator 8. The output of second photoelectric converting element 6 is amplified by amplifier 7, and transmitted to junction B, formed by capacitor 16 and variable resistor 9, via resistor 14 and diode 15. In the absence of noise, the amplifier output forward biases diode 15 and is stored in capacitor 16. As a result, the potential at junction B is governed by the quantity of light received by second photoelectric converting element 6. The reference level signal is suitably adjusted by variable resistor 9 and is fed to comparator 8 for comparison with the output of photoelectric converting element 4, so that detection signal S (as shown in FIG. 10a) is derived as an output of comparator 8.

Where a noise represented by signal $H_N$ in FIG. 9 is incurred, then a noise signal is also generated in the output of amplifier 7. However, the charging and discharging time constants of capacitor 16 can be determined such that noise signal $H_N$ is insufficient to forward bias diode 15 such that the potential at point B in FIG. 11 is not affected, or is only slightly affected by noise signal $H_N$. Thus, the potential at junction B is maintained substantially at a constant level, commensurate with the quantity of light received by photoelectric converting element 6, so that the reference signal level thus derived does not intersect with the low level portion of the output of amplifier 5. Preferably, the resistance of variable resistor 9 is sufficiently high, as compared with that of resistor 14 such that the discharging time constant of capacitor 16 is extremely long, as compared with its charging time constant, and therefore noise $H_N$ does not affect the output of comparator 8. The circuit arrangement shown in FIG. 11 may be used selectively, such as in the case where there is a danger of noise being developed, because of the fact that the light detected by photoelectric converting element 6 is impeded by a stain, dirt, or dust on the film.

As is apparent from the foregoing description of the microfilm frame sensing circuitry according to the present invention, at least one second photoelectric element 6, adapted to detect only a variation in brightness of the light source is provided in addition to first photoelectric converting element 4, adapted to detect frame-sensing mark M on microfilm F. The output of second photoelectric converting element 6 is compared with the output of first photoelectric converting element 4, so that erroneous detection accruing from a variation in the quantity of the illuminating light is prevented. Meanwhile, in case microfilm F is a negative film, the position of second photoelectric converting element 6 is positioned to receive the light transmitted through an upper edge portion of microfilm F, so that the output of second photoelectric converting element 6 is separately derived as a signal adapted to detect the basic density of the film, which represents information representing the quality of the film. Additionally, while the aforementioned embodiment utilizes the light transmitted through the film for detecting a mark, it should be understood that the present invention may be likewise applied to microreader apparatus which employs reflected light, with the same result.

What is claimed is:

1. Frame detection circuitry for sensing frame sensing marks on a microfilm being transported through an exposure station in microfilm reader apparatus, comprising:

light emitting means for illuminating the microfilm;
first photoelectric converting means responsive to the light transmitted from said frame sensing marks for generating a first output signal;
second photoelectric converting means responsive to light from said light emitting means through a portion of the microfilm other than the portions thereof occupied by said frames or sensing marks;
comparison means for comparing said first output signal with said second output signal, said second output signal providing a reference level signal, whereby said comparison means generates a control signal representing the sensing of a frame when said first output signal exceeds said second output signal;
smoothing circuitry connected to the output of said second photoelectric converting means for smoothing noise signal detected by said second photoelectric converting means; and
adjusting means inserted between said smoothing circuitry and said comparison means for independently varying the output of said smoothing circuitry.

2. Frame detection circuitry as in claim 1 wherein said second photoelectric converting means comprises a plurality of photoelectric converting elements.

3. Frame detection circuitry as in claim 1 further comprising first and second amplifying means for respectively amplifying said first and second output signals.

4. Frame detection circuitry as in claim 1 wherein said smoothing circuit includes means for gating the output of said second amplifier and means for storing the output of said second amplifier representing a detected frame sensing mark.

5. Frame detection circuitry as in claim 4 wherein said gating means is a diode and said storing means is a capacitor, said smoothing circuit further comprising a first resistance connected between said second amplifier output and said diode and a second resistance parallelly connected with said capacitor in series with said diode, said first resistance being less than said second resistance whereby the charging time constant of said capacitor is less than the discharge time constant thereof.

6. Frame detection circuitry as in claim 5 wherein said second resistance is a potentiometer having a movable terminal connected to said comparing means for varying the input of said comparing means from said second photoelectric converting means and forming said adjusting means.

* * * * *